(12) United States Patent
    Nath

(10) Patent No.: US 8,608,360 B2
(45) Date of Patent: Dec. 17, 2013

(54) LIQUID LIGHT GUIDE HAVING POSITION RETAINING FUNCTION

(76) Inventor: Günther Nath, Grüwald (DE)

( * ) Notice: Subject to any disclaimer, the term of this patent is extended or adjusted under 35 U.S.C. 154(b) by 467 days.

(21) Appl. No.: 12/780,014

(22) Filed: May 14, 2010

(65) Prior Publication Data

US 2010/0290244 A1      Nov. 18, 2010

(30) Foreign Application Priority Data

May 18, 2009   (DE) .......................... 10 2009 021 789

(51) Int. Cl.
    *F21V 5/00*         (2006.01)
(52) U.S. Cl.
    USPC ............ 362/572; 362/573; 362/574; 362/575
(58) Field of Classification Search
    USPC ................................................ 362/572–575
    See application file for complete search history.

(56) References Cited

U.S. PATENT DOCUMENTS

| 6,120,161 | A  | * | 9/2000 | Van Der Bel ................ 362/105 |
| 7,802,910 | B2 | * | 9/2010 | Middlemass et al. ........ 362/573 |
| 2007/0081358 | A1 | * | 4/2007 | Shea et al. .................... 362/572 |
| 2009/0112198 | A1 | * | 4/2009 | Khanna et al. ................. 606/15 |

FOREIGN PATENT DOCUMENTS

DE            4233087 A1      4/1994

* cited by examiner

*Primary Examiner* — William Carter
(74) *Attorney, Agent, or Firm* — Barnes & Thornburg LLP

(57) ABSTRACT

An illumination apparatus includes an irradiation source and a liquid light guide coupled thereto. The liquid light guide has the form of a goose neck. A liquid filled light guide tube of the liquid light guide is supported in a position retaining tube and at least one end of the light guiding tube, preferably the light input end, is supported rotatably in the position retaining tube.

12 Claims, 3 Drawing Sheets

LIQUID LIGHT GUIDE HAVING POSITION RETAINING FUNCTION

CROSS-REFERENCE TO RELATED APPLICATION

The present application claims the benefit of priority to German Patent Application No. 10 2009 021 789.4 filed 18 May 2009, the contents of which are incorporated herein by reference in their entirety.

BACKGROUND OF THE INVENTION

The present invention relates to an illumination apparatus having an irradiation source and a liquid light guide coupled thereto. The liquid light guide comprises a flexible position retaining tube which can be directed by a human operator to an object to be illuminated and which maintains thereafter its spatial positioning.

Illumination apparatuses of this kind are known in the prior art in connection with light guides made of glass fiber bundles. They are typically used in laboratories and referred to as light sources with "goose neck" light guides. Typically, they contain an irradiation source with a tungsten/halogen-reflector lamp and one (or a plurality of) light guides made of fiber glass bundles. The light guides are positioned within a flexible armoring tube having a position retaining function. The known goose neck light guides have a total length of less than one meter which is sufficient for most applications. The outer armoring tubes which are also known as position retaining or holding tubes are commercially available and are manufactured by winding a metallic profile band with a sealing strand or wire. A special technology is responsible for the holding function after the bending.

Since light guides made of fiber glass bundles are highly flexible, the two ends of a fiber glass bundle can readily be twisted against each other. Therefore, for manufacturing a goose neck light guide, the fiber bundle can simply be inserted into the holding tube and the corresponding end portions of the fiber glass bundle at the first and second ends of the holding tube can be glued to the holding tube in order to provide a fixed connection there between. If such a goose neck light guide is then fixedly mounted at one end to the irradiation source, the other end can be freely manipulated. Due to its high inner flexibility the fiber glass bundle inside the holding tube can absorb the changes of the relative position between light guide and irradiation source caused by the manipulation, without causing strain in the fiber bundle and running the risk of damages due to broken fibers.

Liquid light guides, as described in DE 42 33 087 A1 by way of example, are known for more than 30 years in the market. Compared to light guides made of fiber glass bundles they provide the advantage of an improved transmission in the short wavelength region of the visible spectrum and in the UV region. This is particularly useful for certain laboratory applications, such as fluorescence excitation with short wavelength irradiation.

It is desired to have a goose neck arrangement for liquid light guides as well. Liquid light guides contain a fluor-carbon-tube (F-C-tube) which is filled with a liquid. This tube is also referred to as the "light guide core" and is mechanically sealed at both ends by glass plugs and sealing sleeves. In contrast to the highly flexible fiber glass bundles, liquid light guides are only semi-flexible and the two ends of the liquid light guides cannot be twisted against each other. The mechanical disadvantages of liquid light guides become more and more relevant when the diameter of the light active core gets larger, i.e. when the diameter is 3 mm or higher.

When a goose neck liquid light guide is manufactured according to the same pattern as the above described fiber glass bundles and the light input end of the light guide is fixed to a light source with a high power UV-lamp, manipulations of the light guide in use result in deformings of the F-C-tube inside the holding tube. This causes transmission losses and heats the liquid light guide locally up. After a certain amount of time during which intensive light in the region of irradiation powers of plural watts applied to the liquid light guide, there might be permanent damages and deformings of the fluor-carbon light guide tube and the optical transmission of the liquid light guide decreases drastically.

SUMMARY OF THE INVENTION

It is an object of the present invention to overcome the above described disadvantages in the prior art and to provide a goose neck liquid light guide which can be coupled to high power light sources, such as tungsten/halogen-incandescent lamps, mercury or xenon-plasma lamps or arrays of light emitting semiconductor diodes (LEDs), and which shows substantially no transmission losses when being arbitrarily manipulated on a continuing basis. The object is met by the illumination apparatus defined in appended claim 1. The dependent claims relate to preferred embodiments.

According to an embodiment, the liquid filled fluor-carbon-tube forming the core of the liquid light guide is inserted with its both ends sealed into a holding tube and at least one end of the light guiding tube is supported in such a way in the holding tube that the light guiding core including the sealing means remains rotatable inside the outer holding tube but is fixed against translations along the axis of the holding tube. The other end of the light guide can be supported in the same manner. If only one end of the liquid light guide core has a rotatable bearing, it is preferably the end at which the light is coupled in.

According to a particularly preferable embodiment, the light input end of the liquid light guide is rotatably supported in the manner described above, while the light output end of the core is merely provided coaxially within the holding means without any additional restrictions concerning rotational or translational movements.

Other aspects and preferred embodiments of the present invention will become apparent from the following detailed description in combination with the drawings.

DETAILED DESCRIPTION OF THE DRAWINGS

Figure 1:
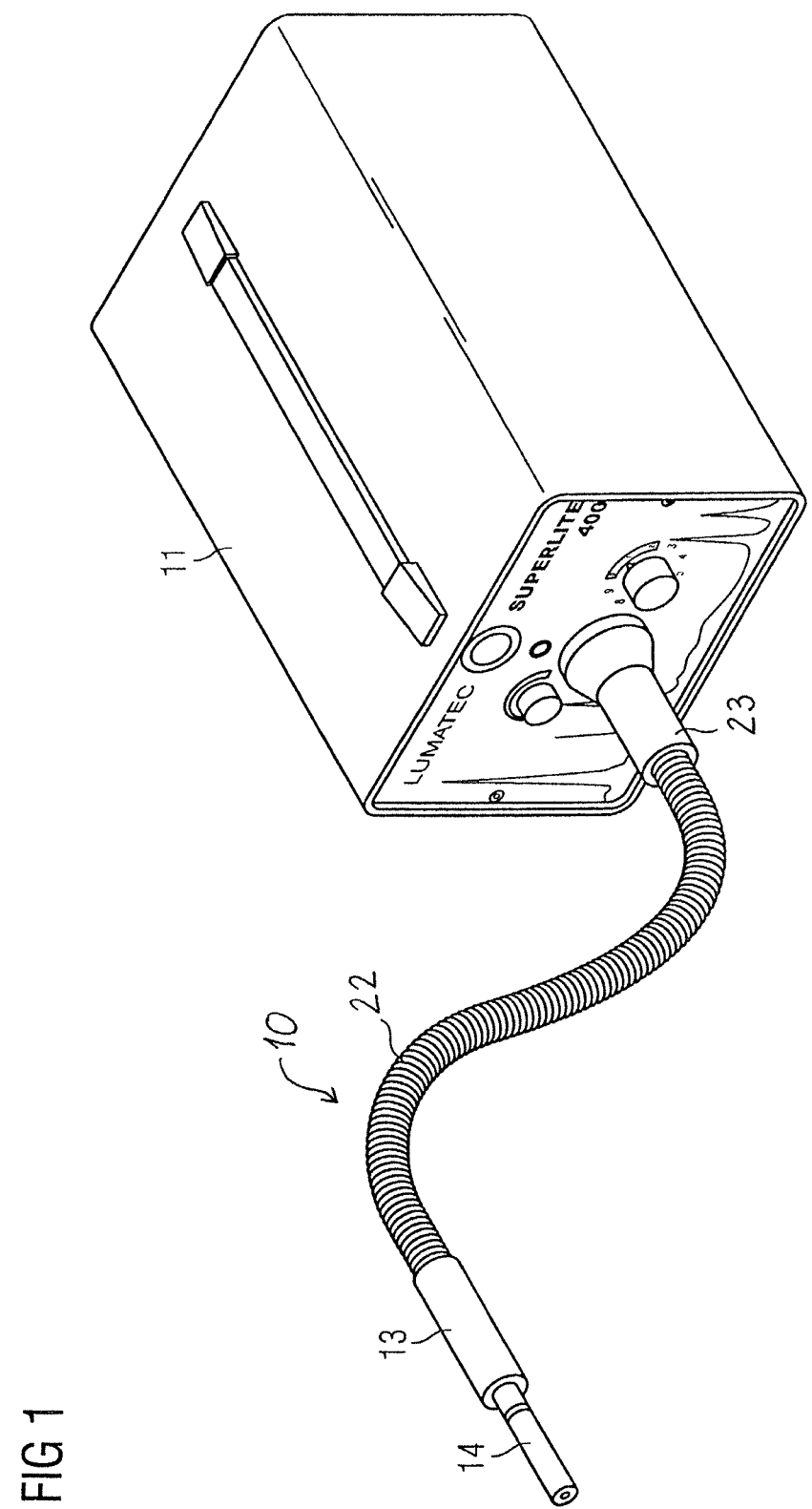
FIG. 1 shows a perspective view of an illumination apparatus according to an embodiment of the present invention.

FIG. 1 shows the irradiation source 11 with the goose neck light guide 10 coupled thereto. The light guide 10 comprises a position retaining tube 22 in the inside of which the liquid filled light guiding tube is arranged. The irradiation source 11 includes a lamp with a focusing unit (not shown) having a reflector and/or a condenser. By way of example, the lamp is a tungsten/halogen-incandescent lamp, a mercury vapor discharge lamp, a xenon discharge lamp or an LED-array. The incandescent filament, the luminescent plasma or the individual LEDs of the array are imaged onto the light input surface of the liquid light guide 10. On both ends of the goose neck holding tube 22 flanges 13, 23 are fixedly mounted, preferably by gluing. At the light output end of the liquid light guide 10, a sealing sleeve 14 is shown.

Figure 2:
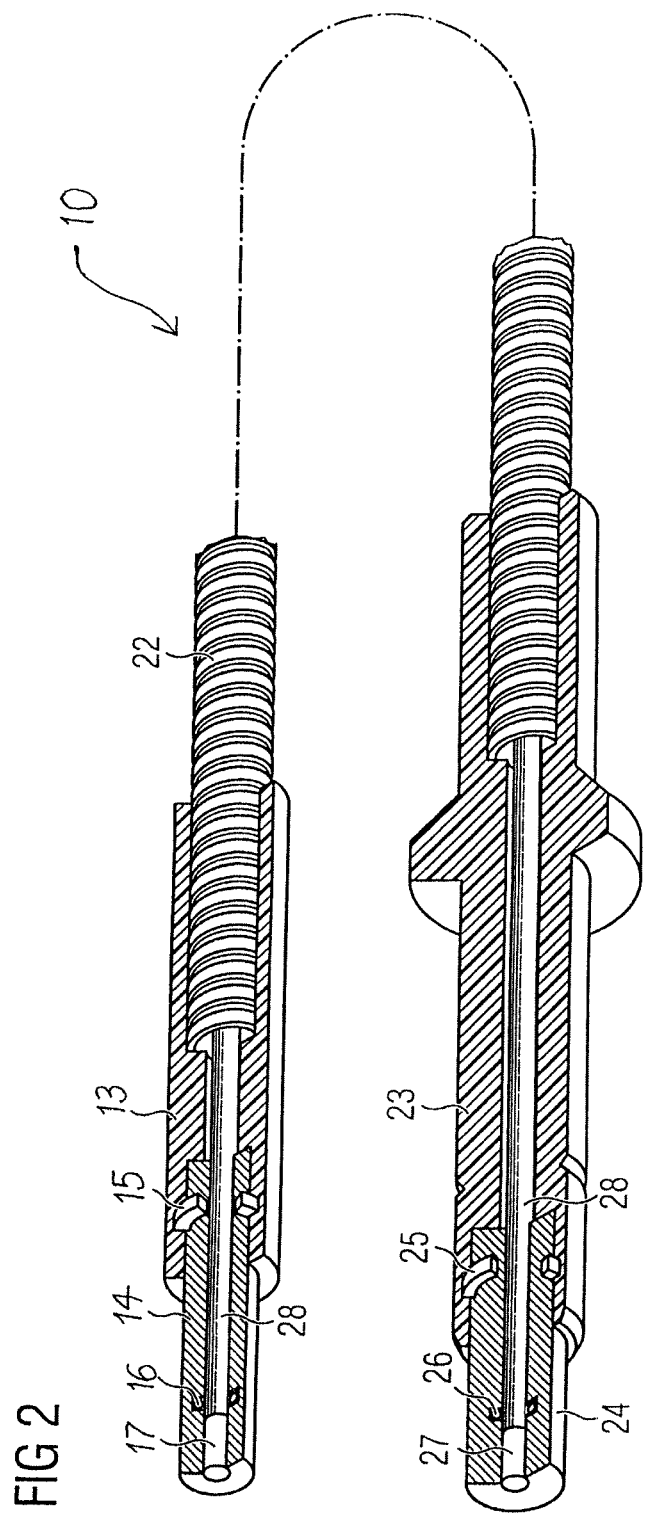
FIG. 2 shows a sectional view of the light input and output ends of the liquid light guide.

FIG. 2 shows a section of both end regions of the goose neck liquid light guide 10 according to the present invention. The already mentioned sealing sleeve 14 at the light output end covers a glass plug 17 and the light guiding fluor-carbon-tube 28 with the liquid filled therein. The sleeve seals the tube against liquid leakage by an O-ring squeeze-type gasket 16. In a symmetrical fashion, the light input end of the light guide 10 has a sealing sleeve 24 which, by means of an O-ring squeeze-type gasket 26 fixes the liquid core tube 28 and a glass plug 27 to each other. The sealing sleeves 14, 24 and the inner tube 28 thereby form a unit of components which are fixed to each other.

The sealing sleeves 14, 24 and the outer flanges 13, 23 of the holding tube 22 are each rotatably connected to each other by a snap ring 15, 25, respectively. Each snap ring 15, 25 is simultaneously supported in an outer groove of the corresponding sleeve 14, 24 and an inner groove of the corresponding flange 13, 23 which extends coaxially to the groove of the sleeve. When the holding tube 22 is not bent but put straight, the core formed by the tube 28, the plugs 17, 27 and the sleeves 14, 24 is freely rotatable within the outer tube 22 and nevertheless secured against axial translation.

An additional load release of the liquid light guide core during manipulation, particularly of the non-twistable fluor-carbon-tube 28 contained therein, can be achieved by mounting the holding tube 22 not fixedly to the housing of the irradiation source 11, but supporting the tube 22 rotatably and coaxially to the optical axis of the irradiation source. However, the rotatability of the holding tube 22 relative to the irradiation source 11 must not be completely free moving. Otherwise, the goose neck liquid light guide 10 could not maintain its spatial positioning and would drop down due to its weight and the corresponding leverage forces. The rotation movement of the holding tube 22 with respect to the irradiation source 11 therefore has to include a defined friction, which can, for example, be realized by a friction clutch.

Figure 3A:
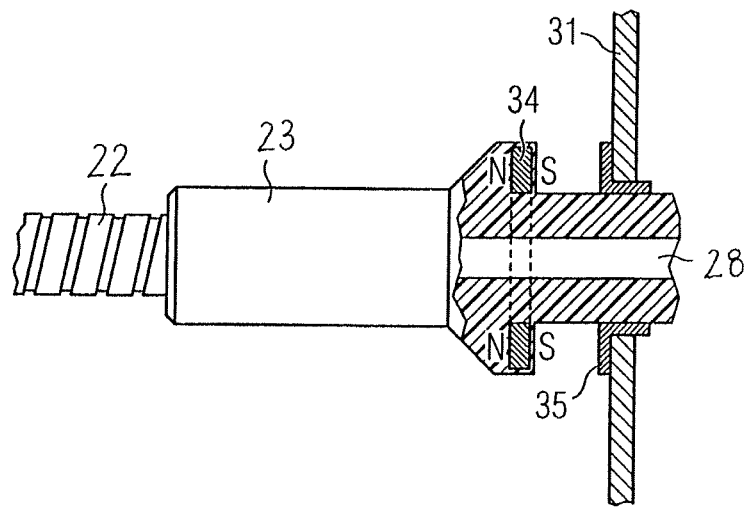
FIG. 3a is a partially sectional side view of the mounting of the liquid light guide to the housing of the light source in a first position.
Figure 3B:
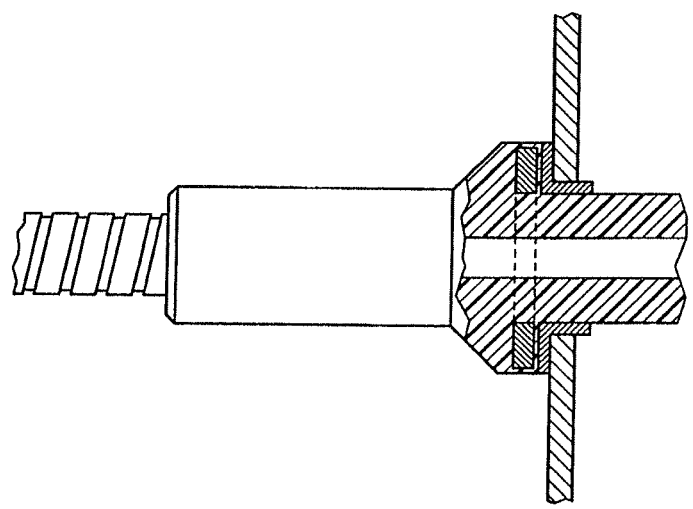
FIG. 3b is partially sectional side view of the mounting of the liquid light guide to the housing of the light source in a second position.

An example of such a friction clutch is shown in FIGS. 3*a* and 3*b*. In the shown example, it is realized by a magnet ring 34 which effects a frictional resistance against rotation by its attraction force to the housing wall 31. The magnet ring is preferably a permanent magnet which is arranged within the flange 23 at the light input end of the goose neck light guide 10. The magnet 34 is mounted coaxially to the optical axis and opposite to a ring-shaped counterpart 35 made of magnetic material and mounted to the housing wall 31. As soon as the goose neck light guide 10 is completely inserted into the irradiation source 11 (FIG. 3*b*) the magnet ring 34 magnetically adheres to the counterpart 35. The friction between the flange 23 and the counterpart 35 then provides the desired defined resistance against rotations of the holding tube 22 with respect to the housing wall 31. Said resistance is not present in the not fully inserted position shown in FIG. 3*a*.

The ring-shaped counterpart 35 can for example be made of magnetic stainless steel and can be additionally roughened to hamper the rotatability of the light guide. Other mechanisms for a friction clutch are equivalently possible by means of corrugated washers or O-rings.

BEST MODE OF CARRYING OUT THE PRESENT INVENTION

In the best mode of carrying out the present invention, the snap ring 15 at the light output end is omitted and the tube is coaxially inserted in the holding tube 22 without additional restrictions concerning its rotational and translational movements. The connection between light guiding tube 28 and holding 22 is realized by the snap ring 25 only. This embodiment has a particularly simple construction and nevertheless fulfils the goal of a bearing of the light guiding tube 28 within the holding tube 22 which is secured against axial translation and allows intrinsic rotation.

In praxis, the goose neck liquid light guide 10 is manufactured from components so that the outer diameter of the tube 28 is at least 15 to 30% smaller than the inner diameter of the holding tube 22. Thereby, the sensible liquid light guide core has additional possibilities to evade during the manipulation of the goose neck light guide 10 in use.

In an endurance test, the goose neck liquid light guide 10 according to the present invention showed a satisfying stability of the optical transmission even under frequent manipulation and a light irradiation power of plural watts.

What is claimed is:

1. An illumination apparatus comprising an irradiation source and a liquid light guide which is coupled to the irradiation source and includes a light guiding tube filled with a liquid, wherein
the liquid light guide further includes a position retaining tube which holds its position after bending and within which the light guiding tube is arranged, and
at least one end of the light guiding tube is rotatably supported with respect to the position retaining tube by connection means rotatably connecting a sealing end member at the at least one end of the light guiding tube with a pipe element fixed to the position retaining tube.

2. The illumination apparatus of claim 1, wherein
the light guiding tube is fixed at the at least one end to the sealing end member, and
the pipe element is a coaxially arranged flange, in which the end member is rotatably supported.

3. The illumination apparatus of claim 1, wherein the sealing end member is a sleeve within which the at least one end of the light guiding tube is fixed by a sealing element, preferably an O-ring.

4. The illumination apparatus of claim 3, wherein the sealing element seals the liquid light guide against liquid leakage at the front face of the light guiding tube together with a plug which is also arranged in the end member.

5. The illumination apparatus of claim 1, wherein the connection means is a snap ring.

6. The illumination apparatus of claim 1, wherein the connection means is simultaneously engaged in an outer groove of the end member and an inner groove of the pipe element extending coaxially thereto.

7. The illumination apparatus of claim 1, wherein the light guiding tube comprises a fluor-carbon-polymer, preferably Teflon® FEP.

8. The illumination apparatus of claim 1, wherein the position retaining tube is made of a flexible metallic profile band wound with a sealing strand or wire.

9. The illumination apparatus of claim 1, wherein the light guiding tube is supported rotatably relative to the position retaining tube only at one of its two ends, and another one of its two ends extends within the position retaining tube coaxially thereto without any special bearing means and without undergoing any additional restrictions concerning its rotational or translational movements with respect thereto.

10. The illumination apparatus of claim 9, wherein the light guiding tube is supported rotatably relative to the position retaining tube at the light input end.

11. The illumination apparatus of claim 1, wherein a friction clutch is provided at a location where the liquid light guide exits a housing of the irradiation source, and wherein the friction clutch effects a defined friction resistance of the position retaining tube with respect to the wall of the housing.

12. The illumination apparatus of claim 11, wherein the friction clutch comprises a magnet ring mounted at the light input end of the position retaining tube, and wherein the magnet ring effects a magnetic adhering force to a counterpart mounted at the housing wall and thereby effects a resistance against rotation.

* * * * *